United States Patent
Suzuki et al.

(10) Patent No.: US 7,885,605 B2
(45) Date of Patent: Feb. 8, 2011

(54) COMMUNICATION TERMINAL APPARATUS, COMMUNICATION SYSTEM, COMMUNICATION METHOD, AND PROGRAM

(75) Inventors: Koichi Suzuki, Kanagawa (JP); Takashi Ichimasa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 11/944,516

(22) Filed: Nov. 23, 2007

(65) Prior Publication Data

US 2008/0125049 A1 May 29, 2008

(30) Foreign Application Priority Data

Nov. 24, 2006 (JP) .............................. 2006-317683

(51) Int. Cl.
*H04B 1/00* (2006.01)
*H04B 15/00* (2006.01)

(52) U.S. Cl. ................... 455/63.1; 455/423; 455/404.2; 455/456.1; 455/456.2; 370/229; 370/232; 370/233; 370/328; 370/338

(58) Field of Classification Search ................ 455/63.1, 455/423, 404.2, 456.1, 456.2, 67.11
See application file for complete search history.

(56) References Cited

U.S. PATENT DOCUMENTS 5,701,427 A * 12/1997 Lathrop ...................... 709/237
2002/0046379 A1 4/2002 Miki et al.
2005/0141529 A1 6/2005 Miyajima et al.
2005/0235190 A1 10/2005 Miyazaki et al.
2006/0251122 A1 11/2006 Abe et al.
2007/0133544 A1 6/2007 Shida
2007/0230423 A1 10/2007 Yoshida et al.

FOREIGN PATENT DOCUMENTS

JP 2002-523934 7/2002
JP 2004348186 A * 12/2004
WO 00/10348 2/2000

* cited by examiner

*Primary Examiner*—Tuan A Pham
(74) *Attorney, Agent, or Firm*—Greenblum & Bernstein, PLC

(57) ABSTRACT

A communication terminal apparatus, communication system, communication method, and program are provided that enable a decoding section of a mobile communication apparatus to be controlled and operated only when necessary even when receive data retransmission occurs. A radio communication apparatus is equipped with a radio antenna, a demodulation section that performs demodulation of receive data, a data combining section that combines the demodulated data with past data, a decoding section that decodes the combined data, an error correction section that performs error correction processing using the decoded data, an error determination section that determines a data error using the data on which error correction processing has been performed, a transmitting section, a retransmission determination section that determines data reliability and the number of retransmission requests based on the communication state of receive data, and a control section that controls each of the above sections, and control section stops the operation of decoding section and subsequent sections until data reliability determined by retransmission determination section exceeds a predetermined threshold value.

13 Claims, 11 Drawing Sheets

| COMMUNICATION STATE | NUMBER OF RETRANSMISSIONS | DATA RELIABILITY |
|---|---|---|
| A | 1 | 1 |
| B | 2 | 1/2 |
| C | 3 | 1/3 |
| D | 4 | 1/4 |

RETRANSMISSION REQUEST
RECORD TABLE:314

| FIELD STRENGTH RANK | RETRANSMISSION REQUEST RECORD COUNT |
|---|---|
| A | 1 |
| B | 2 |
| C | 3 |
| D | 4 |
| E | 5 |
| F | 6 |

COMMUNICATION TERMINAL APPARATUS, COMMUNICATION SYSTEM, COMMUNICATION METHOD, AND PROGRAM

CROSS REFERENCE TO RELATED APPLICATIONS

The disclosure of Japanese Patent Application No. 2006-317683 filed on Nov. 24, 2006 including the specification, drawings and abstract is incorporated herein by reference in its entirety.

BACKGROUND OF THE INVENTION

1. Field of the Invention

The present invention relates to a communication terminal apparatus, communication system, communication method, and program, and more particularly to improvement of an error control technology suitable for communication in an environment prone to the occurrence of code errors, such as mobile radio communication.

2. Description of the Related Art

Error correction coding technology and automatic retransmission control technology (ARQ: Automatic Repeat Request) are important error control technologies in performing digital communication. A technology named Hybrid ARQ that uses both of these technologies is known to be extremely effective particularly in a fading environment such as in the case of mobile radio communication.

An outline of the operation of a mobile communication apparatus in packet communication using Hybrid ARQ will now be given with reference to FIG. 1. Details of the radio communication method are given in 3GPP (3rd Generation Partnership Project), for example.

FIG. 1 is a block diagram showing the configuration of a conventional radio communication system.

In FIG. 1, a radio communication system is composed of a base station (BTS) 10 and a plurality of mobile communication apparatuses 20.

A mobile communication apparatus 20 is configured by means of a radio antenna 21, a demodulation section 22, a data combining section 23, a decoding section 24, an error correction section 25, an error determination section 26, a control section 27 implemented by hardware (HW) or software (SW), and a transmitting section 28.

In the above-described configuration, demodulation section 22 in mobile communication apparatus 20 receives packet data transmitted from base station 10, and performs demodulation processing. Data combining section 23 performs combining processing on past demodulated packet data and current demodulated packet data. Decoding section 24 decodes the combined data and outputs decoded data to error correction section 25. Error correction section 25 performs error correction on the decoded data, and error determination section 26 performs error determination processing on the error-corrected data. If there are no errors in the data, an ACK (Acknowledgment) signal is transmitted to base station 10 from transmitting section 28. Base station 10 receives the ACK signal from mobile communication apparatus 20, and transmits new data to mobile communication apparatus 20.

On the other hand, if the packet data is determined to contain an error as a result of the error determination processing, mobile communication apparatus 20 transmits a NACK (Negative Acknowledgment) signal to base station 10 from transmitting section 28, and requests retransmission. Mobile communication apparatus 20 performs demodulation processing, data combining processing, decoding processing, error correction processing, and error determination processing again on data retransmitted from base station 10.

The above-described processing is performed until error determination section 26 determines that no error is contained in the relevant packet data. That is to say, each time a NACK signal is returned by mobile communication apparatus 20, base station 10 transmits the same packet data to mobile communication apparatus 20, selecting the optimal modulation method for the radio environment, and mobile communication apparatus 20 repeatedly performs demodulation processing, data combining processing, decoding processing, error correction processing, and error determination processing.

In this case, in an adverse fading environment, an error correction code is ineffective because of burst errors and there are many retransmission requests, and a mobile communication apparatus must repeat the series of demodulation processing, data combining processing, decoding processing, error correction processing, and error determination processing operations each time retransmission is performed from the base station. This results in extremely wasteful power consumption by the mobile communication apparatus, affecting the standby time and call time of the mobile communication apparatus.

In order to solve this problem, there is a technology whereby data received by a mobile communication apparatus and previously received data are combined, quality is found from the result of the combining operation, and the procedure is repeated until a predetermined quality level is attained (see, for example, Patent Document 1: National Publication of International Patent Application No. 2002-523934).

However, a problem with this kind of conventional radio communication system is that, if the radio communication environment created by a mobile communication apparatus and base station is poor, data reception, combining processing, decoding processing, error correction processing, and error determination processing are performed repeatedly, consuming power.

For example, in Patent Document 1, although the data error rate when decoding processing is performed falls significantly since combining processing is performed on previously received data and newly received data until data received by a mobile communication apparatus attains a predetermined quality level, no mention is made of the control of the decoding section until the predetermined quality level is attained. As the packet data transmission speed increases, it becomes necessary for a plurality of decoding sections to be provided in a mobile communication apparatus, and for these to perform processing in parallel. Therefore, the wasteful mobile communication apparatus power consumption will be fully appreciated by those skilled in the art.

SUMMARY OF THE INVENTION

It is an object of the present invention to provide a communication terminal apparatus, communication system, communication method, and program that enable a decoding section of a mobile communication apparatus to be controlled and operated only when necessary even when receive data retransmission occurs.

According to an aspect of the invention, a communication terminal apparatus is equipped with a demodulation section that performs demodulation of receive data, a data combining section that combines the demodulated data with past data, a decoding section that decodes the combined data, an error correction section that performs error correction processing using the decoded data, an error determination section that determines a data error using data on which the error correction processing has been performed, a data reliability determination section that determines data reliability based on the communication state of the receive data, and a control section that stops operation of the decoding section until the data reliability exceeds a predetermined threshold value.

According to an aspect of the invention, a communication system is equipped with a base station and a plurality of communication terminal apparatuses present within the radio communication coverage area of the base station, wherein the communication terminal apparatuses are equipped with a demodulation section that performs demodulation of receive data, a data combining section that combines the demodulated data with past data, a decoding section that decodes the combined data, an error correction section that performs error correction processing using the decoded data, an error determination section that determines a data error using data on which the error correction processing has been performed, a data reliability determination section that determines data reliability based on the communication state of the receive data, and a control section that stops operation of the decoding section, or operation of the decoding section, the error correction section, and the error determination section, until the data reliability exceeds a predetermined threshold value.

According to an aspect of the invention, a communication method performs radio communication via a base station, and has a step of performing demodulation of receive data, a step of combining the demodulated data with past data, a decoding step of decoding the combined data, a step of performing error correction processing using the decoded data, a step of determining a data error using data on which the error correction processing has been performed, a step of determining data reliability based on the communication state of the receive data, and a step of issuing a retransmission request to the base station at predetermined timing and stopping operation of the decoding step onward until the data reliability exceeds a predetermined threshold value.

DETAILED DESCRIPTION OF THE PREFERRED EMBODIMENTS

With reference now to the accompanying drawings, embodiments of the present invention will be explained in detail below.

Embodiment 1

Figure 1:
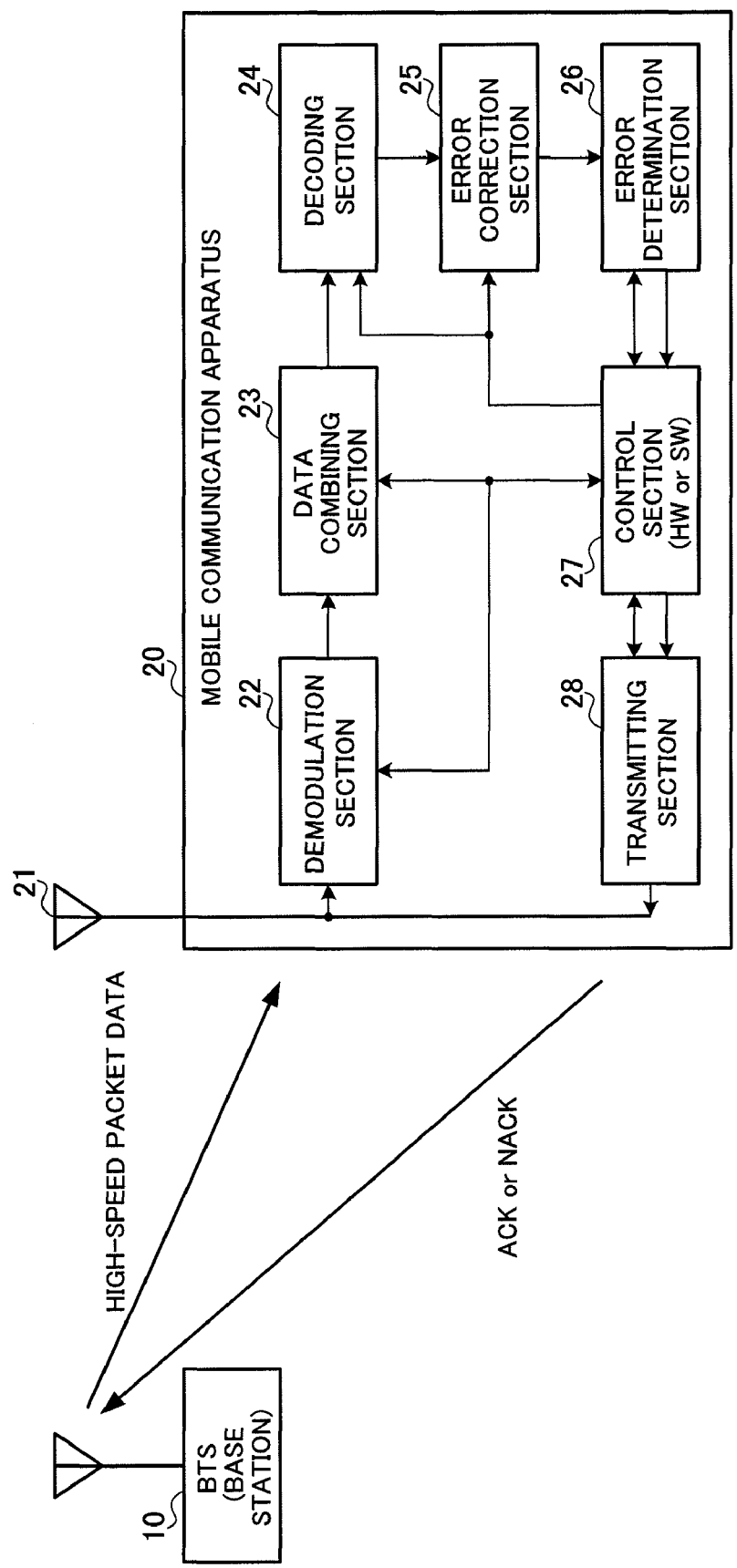
FIG. 1 is a block diagram showing the configuration of a conventional radio communication system.
Figure 2:
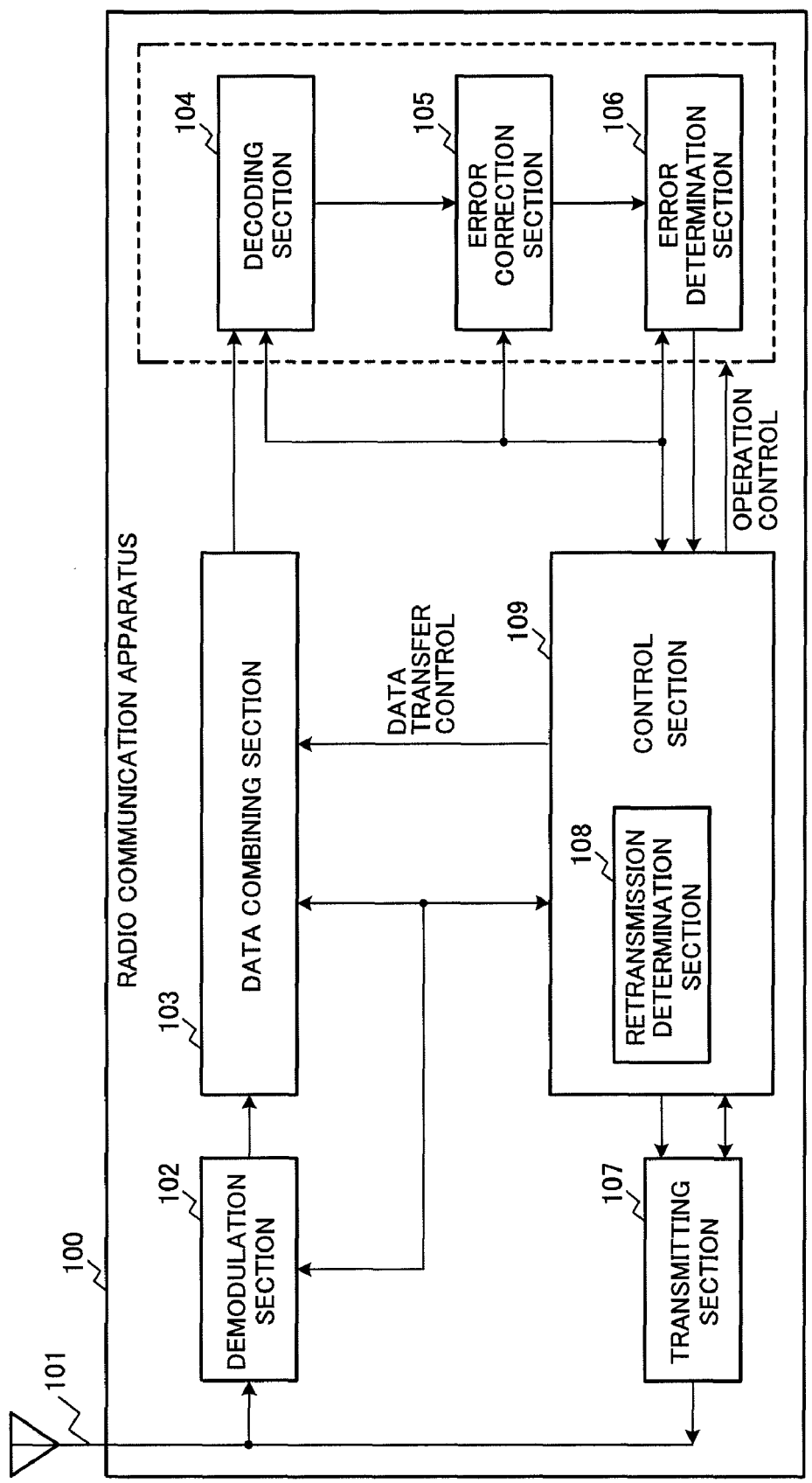
FIG. 2 is a configuration block diagram of a radio communication apparatus according to Embodiment 1 of the present invention.

FIG. 2 is a configuration block diagram of a radio communication apparatus according to Embodiment 1 of the present invention. This is an example of application to a communication system equipped with a base station and a plurality of communication terminal apparatuses present in the radio communication coverage area of this base station. The general configuration of a communication system using a communication terminal apparatus according to Embodiment 1 is the same as the conventional configuration shown in FIG. 1.

In FIG. 2, a radio communication apparatus 100 is configured by means of a radio antenna 101, a demodulation section 102, a data combining section 103, a decoding section 104, an error correction section 105, an error determination section 106, a transmitting section 107, and a control section 109 having a retransmission determination section 108.

Radio antenna 101 receives a radio signal. Demodulation section 102 receives data received via radio antenna 101 in a time sequence, and performs demodulation processing and so forth. Data combining section 103 performs storage of the data sequence received via demodulation section 102 on which demodulation processing and so forth has been performed or combining with a data sequence received in the past via demodulation section 102 on which demodulation processing and so forth has been performed. Decoding section 104 decodes the data sequence combined by data combining section 103. Error correction section 105 performs error correction processing on the data sequence decoded by decoding section 104. Error determination section 106 performs error determination for the data sequence on which error correction processing has been performed by error correction section 105. Transmitting section 107 transmits data that has undergone error determination processing by error determination section 106 to the base station.

Retransmission determination section 108 determines data reliability based on the communication state (communication path radio wave state) of receive data for which reception, demodulation processing, and so forth has been performed by demodulation section 102. Data reliability determination is performed using number-of-retransmissions determination table 110 shown in FIG. 3.

Control section 109 performs basic control such as generation, setting, and reset control for various parameters of radio antenna 101, demodulation section 102, data combining section 103, decoding section 104, error correction section 105, error determination section 106, and transmitting section 107, and also control for operating decoding section 104 and subsequent sections, or not operating decoding section 104 and subsequent sections and issuing a retransmission request, based on the data reliability determination result from retransmission determination section 108.

That is to say, if data reliability determined by retransmission determination section 108 is greater than or equal to a predetermined threshold value (for example, if data reliability is greater than or equal to 1), control section 109 performs control for operation of decoding section 104 and subsequent sections (that is, decoding section 104, error correction section 105, and error determination section 106) and also performs control for data transfer from data combining section 103 to decoding section 104, whereas if data reliability determined by retransmission determination section 108 is less than a predetermined threshold value (for example, if data reliability is ½), control section 109 performs control so that decoding section 104 and subsequent sections are not operated and a retransmission request is issued. Here, retransmission determination section 108 performs addition of data reliability each time data retransmission is performed, based on the communication state (communication path radio wave state), and the totaled data reliability is the determination result. Control section 109 only sets operation enabling for decoding section 104, error correction section 105, and error determination section 106 when the totaled data reliability exceeds a predetermined threshold value.

Figures 3, 4:
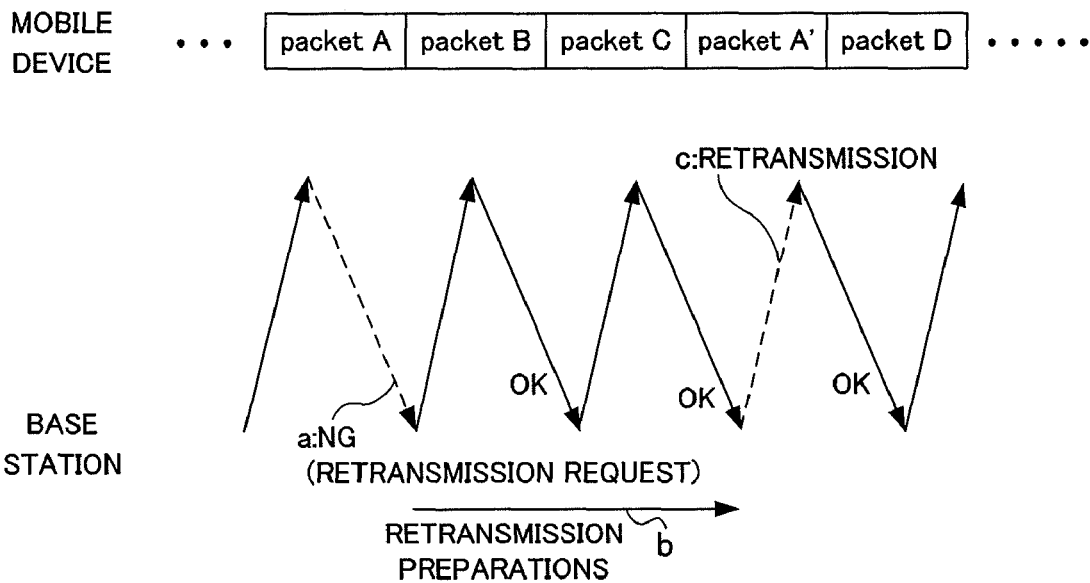
FIG. 3 is a drawing showing an example of a number-of-retransmissions determination table used when the retransmission determination section of a radio communication apparatus according to above Embodiment 1 determines the number of retransmissions, etc.
FIG. 4 is a drawing explaining the nature of packet arrival and the retransmission request generation mechanism of a radio communication apparatus according to above Embodiment 1.

FIG. 3 is a drawing showing an example of number-of-retransmissions determination table 110 used when retransmission determination section 108 determines the number of retransmissions, etc. Number-of-retransmissions determination table 110 is stored in nonvolatile memory or a register with power supply backup, and is updated by retransmission determination section 108.

In FIG. 3, number-of-retransmissions determination table 110 has numbers of retransmissions 1 to 4, and data reliabilities 1, ½, ⅓, and ¼, corresponding to receive data communication states (communication path radio wave states) A through D. Communication state A represents the best radio environment, with a number of retransmissions of 1 or less, and data reliability of 1 (the top rank). As the communication state deteriorates, the number of retransmissions increases and data reliability falls. For example, in communication state D, the number of retransmissions is 4 and data reliability is ¼. In this embodiment, data reliability is included in addition to the number of retransmissions for the following reason. Namely, since the radio environment changes momentarily, the radio environment at the time of first reception may be better or worse than the radio environment at the time of second reception, for example. Therefore, providing the data reliabilities for communication states A through D allows the first-time data reliability and second-time data reliability to be added together. If the radio environment resulting from data reliability addition shows an improving trend, the data reliability obtained by the addition approaches 1. If the data reliability is 1 or a value close to 1, the communication state is determined to be good. The above relationships between number of retransmissions and data reliability, and the communication state determination and data reliability determination threshold values, are only examples, and any settings may be used.

The base station is of the same kind as base station 10 shown in FIG. 1, and receives ACK/NACK signals and transmits high-speed packet data.

The operation of a radio communication apparatus configured as described above will now be explained.

FIG. 4 is a drawing explaining the nature of packet arrival and the retransmission request generation mechanism.

In FIG. 4, a case is assumed in which high-speed packet data is transmitted from a base station to a mobile device (radio communication apparatus 100). The high-speed packet data may be video streaming data, for example. It is assumed that the base station intends to transmit a packet A, packet B, packet C, packet D, in that order, to the mobile device (radio communication apparatus 100). The mobile device receives packet data from the base station, and identifies the arrival of that packet. If packet A does not arrive, as shown in FIG. 4 a, the mobile device transmits a NACK signal to the base station and requests retransmission. The base station receives the NACK signal and begins retransmission preparations (see FIG. 4b), and at the same time transmits the next packets, B and C. On completing retransmission preparations, the base station retransmits packet A for which it received a retransmission request (shown as packet A') to the mobile device (see FIG. 4c). The mobile device reacquires packet A', and again performs demodulation processing, data combining processing, decoding processing, error correction processing, and error determination processing on the data retransmitted from the base station.

Figure 5:
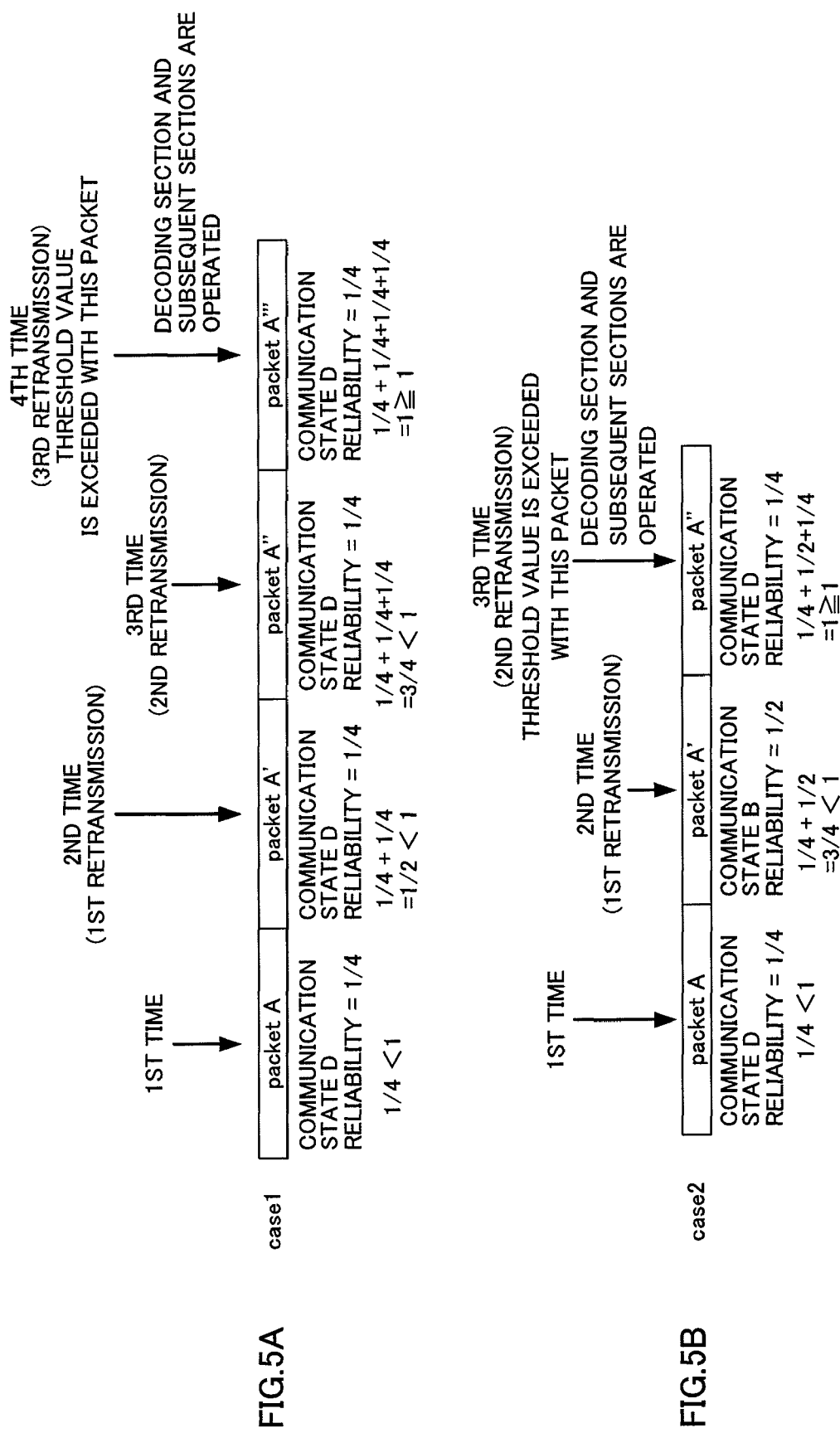
FIG. 5 is a drawing showing actual examples of operation control for a decoding section and subsequent sections according to the data reliability of a radio communication apparatus according to above Embodiment 1.

FIG. 5 is a drawing showing actual examples of operation control for decoding section 104 and subsequent sections according to data reliability, taking the example of a packet A retransmission request. In FIG. 5, packet A for which a first-time retransmission request is received is designated packet A' (having the same contents as packet A), packet A for which a second-time retransmission request is received is designated packet A" (having the same contents as packet A), and so on.

In case 1 in FIG. 5 (a), the radio environment at the time of first reception is communication state D with data reliability of ¼ (see number-of-retransmissions determination table 110 in FIG. 3). Packet A does not arrive, and the mobile device (radio communication apparatus 100) transmits a NACK signal to the base station and requests retransmission. Since the data reliability here is ¼<1, when the retransmission request is transmitted, control section 109 performs control so that decoding section 104 and subsequent sections are not operated in addition to transmission control for that retransmission request. That is to say, when it seems likely that error correction and error determination would give NG results and a retransmission request would occur even if the operations of decoding section 104 and subsequent sections (see the area enclosed by a dotted line in FIG. 2) were executed, a retransmission request is issued without operating decoding section 104 and subsequent sections. In determining whether or not to operate decoding section 104 and subsequent sections, retransmission determination section 108 references number-of-retransmissions determination table 110 and determines whether or not the totaled data reliability has reached a predetermined threshold value (here, 1). Since this is first-time reception, data reliability addition (accumulation) has not been performed and data reliability is ¼<1, and therefore control section 109 executes a retransmission request and control to stop the operation of decoding section 104 and subsequent sections. Stopping the operation of decoding section 104 can be achieved, for example, by turning off power to the relevant circuit blocks.

The radio environment at the time of second (first-retransmission) reception is communication state D with data reliability of ¼. Packet A' does not arrive, and the mobile device (radio communication apparatus 100) again transmits a NACK signal to the base station and requests retransmission. The second-time data reliability is ¼, which is added to the first-time data reliability of ¼ (¼+¼=½), so that the data reliability at this point is ½. Since the data reliability is ½<1, control section 109 executes a retransmission request and control to stop the operation of decoding section 104 and subsequent sections.

The radio environment at the time of third (second-retransmission) reception is communication state D with data reliability of ¼. Despite this being the second retransmission, packet A" does not arrive, and the mobile device (radio communication apparatus 100) again transmits a NACK signal to the base station and requests retransmission. The third-time data reliability is ¼, which is added to the totaled data reliability of ½ for the first and second times (¼+¼+¼=¾), so that the data reliability at this point is ¾. Since the data reliability is ¾<1, control section 109 executes a retransmission request and continues control to stop the operation of decoding section 104 and subsequent sections.

The radio environment at the time of fourth (third-retransmission) reception is communication state D with data reliability of ¼. Despite this being the third retransmission, packet A'" does not arrive, and the mobile device (radio communication apparatus 100) again transmits a NACK signal to the base station and requests retransmission. In this embodiment, as shown in number-of-retransmissions determination table 110 in FIG. 3, a number of retransmissions of 4 is set for communication state D, and therefore, although not shown in FIG. 5 (a), a further fifth (fourth-retransmission) retransmission request is made. The fourth-time data reliability is ¼, giving a data reliability at this point of 4/4=1. Therefore, the totaled data reliability reaches the predetermined threshold value of 1 (4/4=1≧1) with the fourth (third-retransmission) packet. On receiving this determination, control section 109 makes a retransmission request but cancels stoppage of the operation of decoding section 104 and subsequent sections, and performs control so that decoding section 104 and subsequent sections are operated.

Similarly, in case 2 in FIG. 5 (b), the radio environment at the time of first reception is communication state D with data reliability of ¼. Packet A does not arrive, and the mobile device (radio communication apparatus 100) transmits a NACK signal to the base station and requests retransmission. Since the data reliability here is ¼<1, when the retransmission request is transmitted, control section 109 performs control so that decoding section 104 and subsequent sections are not operated in addition to transmission control for that retransmission request.

The radio environment at the time of second (first-retransmission) reception is communication state B with data reliability of ½. Packet A' does not arrive, and the mobile device (radio communication apparatus 100) again transmits a NACK signal to the base station and requests retransmission. The second-time data reliability is ½, which is added to the first-time data reliability of ¼ (¼+½=¾), so that the data reliability at this point is ¾. Since the data reliability is ¾<1, control section 109 executes a retransmission request and control to stop the operation of decoding section 104 and subsequent sections.

The radio environment at the time of third (second-retransmission) reception is communication state D with data reliability of ¼. Despite this being the second retransmission, packet A" does not arrive, and the mobile device (radio communication apparatus 100) again transmits a NACK signal to the base station and requests retransmission. The third-time data reliability is ¼, which is added to the totaled data reliability of ¾ for the first and second times, so that the data reliability at this point is 4/4=1. Therefore, the totaled data reliability reaches the predetermined threshold value of 1 (4/4=1≧1) with the third (second-retransmission) packet. On receiving this determination, control section 109 makes a retransmission request but cancels stoppage of the operation of decoding section 104 and subsequent sections, and performs control so that decoding section 104 and subsequent sections are operated.

Case 2 in FIG. 5 (b) is a case in which the communication path radio wave state is on occasion good, with the existence of communication state B (with data reliability of ½). In a case such as this, the totaled data reliability reaches the predetermined threshold value of 1 sooner, and stoppage of the operation of decoding section 104 and subsequent sections is canceled sooner. In operation control for decoding section 104 and subsequent sections according to this embodiment, essentially, when it seems likely that error correction and error determination would give NG results and a retransmission request would occur even if the operations of decoding section 104 and subsequent sections were executed, a retransmission request is issued without operating decoding section 104 and subsequent sections. Therefore, when data reliability reaches the predetermined threshold value, a radio environment that is good to a certain degree is determined to be present, and stoppage of the operation of decoding section 104 and subsequent sections is canceled. From the standpoint of operational stability, it is desirable for stoppage of the operation of decoding section 104 and subsequent sections to be canceled in advance in preparation for packet arrival. In particular, when power to decoding section 104 and subsequent sections has been turned off, recovery time should be taken into consideration when executing this control.

Since the operation of decoding section 104 and subsequent sections is stopped until the total data reliability value exceeds a threshold value in this way, the number of times operations of decoding section 104 and subsequent sections—that is, decoding processing, error correction processing, and error determination processing—are executed can be reduced, and power consumption can be suppressed.

Figure 6:
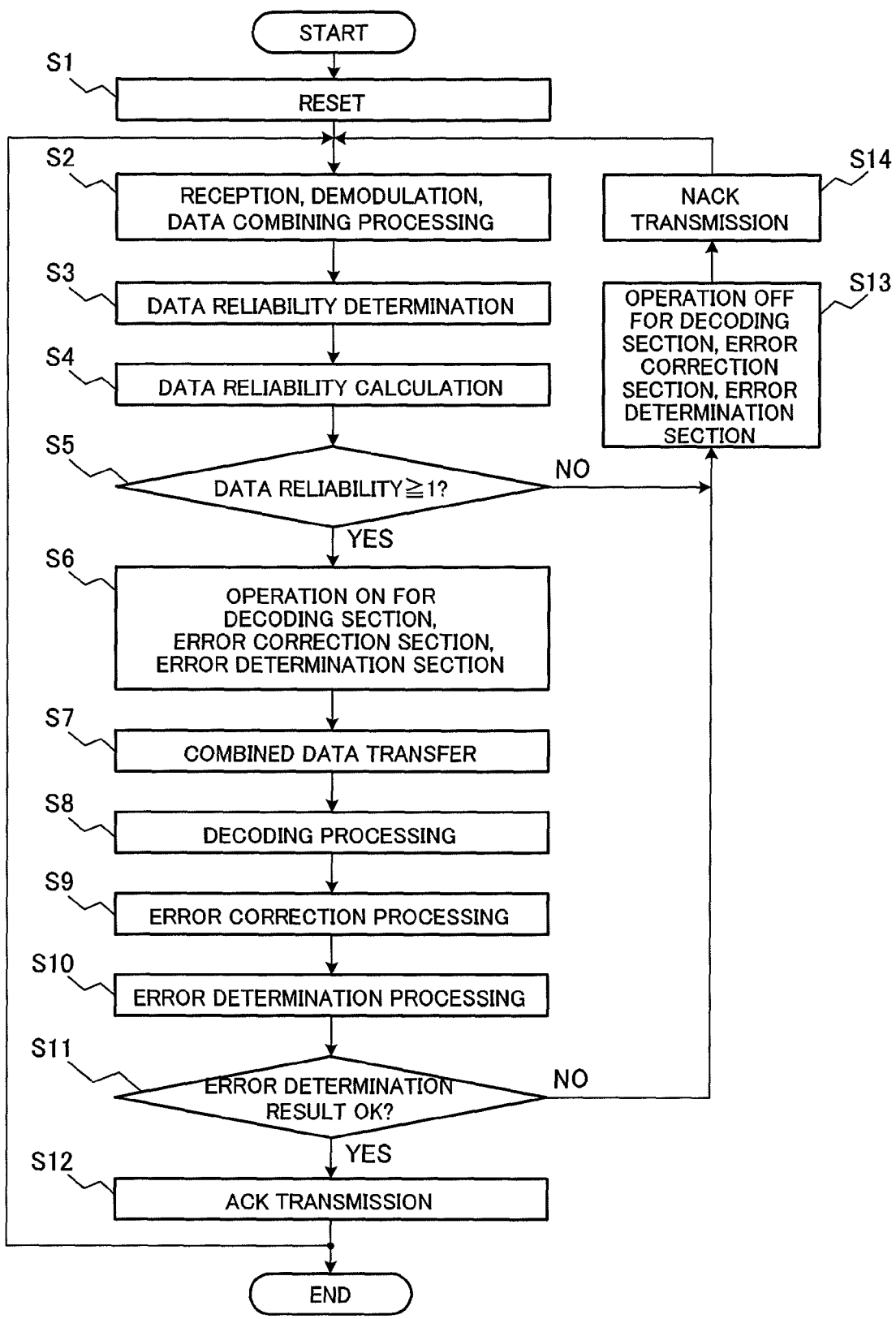
FIG. 6 is a flowchart showing communication processing of a radio communication apparatus according to above Embodiment 1.

FIG. 6 is a flowchart showing communication processing of radio communication apparatus 100, executed by control section 109. In this flowchart, "S" indicates a step of the processing flow.

First, in step S1, a retransmission determination section 108 reset and parameter setting are performed. Then, in step S2, demodulation section 102 receives data received via radio antenna 101 in a time sequence, and performs demodulation processing and so forth, and data combining section 103 performs storage and combining of demodulation section 102 output data.

In step S3, retransmission determination section 108 performs data reliability determination based on the data processed by demodulation section 102. The data reliability determination method is explained in FIG. 3 through FIG. 5.

Then, in step S4, data reliability is calculated. Since the radio environment changes momentarily, the radio environment at the time of first reception may be better or worse than the radio environment at the time of second reception, for example. Therefore, providing the data reliabilities for the communication states, as shown in number-of-retransmissions determination table 110 in FIG. 3, allows the first-time data reliability and second-time data reliability to be added together. By this means it is possible to perform appropriate retransmission determination.

In step S5, it is determined whether or not the data reliability value found by addition in the course of step 4 is greater than or equal to 1. If the data reliability is greater than or equal to 1, in step S6 enabling of the operation of decoding section 104, error correction section 105, and error determination section 106 is set.

Next, in step S7, enabling of combined data transfer from data combining section 103 to decoding section 104 is set, and in step S8, decoding section 104 decodes the data sequence processed by data combining section 103.

In step S9, error correction section 105 performs error correction using the data sequence processed by decoding section 104, and in step S10, error determination section 106 performs error determination using the data processed by error correction section 105.

Then, in step S11, the error determination section 106 error determination result is determined. If the error determination result is OK, in step S12 an ACK signal is transmitted to the radio base station by transmitting section 107, and the processing flow returns to above step S2 if there is further receive data, or is terminated if there is no further receive data.

If the error determination result in above step S11 is NG, or if the data reliability in above step S5 is less than 1, in step S13 stoppage of the operation of decoding section 104, error correction section 105, and error determination section 106 is set, and in step S14 a NACK signal is transmitted to the radio base station by transmitting section 107, and the processing flow returns to above step S2.

As described in detail above, according to this embodiment, a radio communication apparatus 100 is equipped with a radio antenna 101, a demodulation section 102 that performs receive data demodulation, a data combining section 103 that combines demodulated data and past data, a decoding section 104 that decodes the combined data, an error correction section 105 that performs error correction processing using the decoded data, an error determination section 106 that performs data error determination using the data on which error correction processing has been performed, a transmitting section 107, a retransmission determination section 108 that determines data reliability and the number of retransmission requests based on the communication state of receive data, and a control section 109 that controls each of the above sections, and control section 109 stops the operation of decoding section 104 and subsequent sections until data reliability determined by retransmission determination section 108 exceeds a predetermined threshold value—that is, performs control so that decoding processing, error correction processing, and error determination processing are performed only when that data reliability exceeds the predetermined threshold value—thereby enabling the number of times decoding processing, error correction processing, and error determination processing are executed to be reduced, and power consumption to be suppressed. In particular, in a radio communication environment comprising a mobile device (radio communication apparatus 100) and base station, when the radio communication environment is poor, it is possible to prevent power being consumed through repeated execution of data reception, combining processing, decoding processing, error correction processing, and error determination processing in the mobile device.

Thus, according to this embodiment, the communication state is gauged and data reliability is updated each time data is received, enabling appropriate retransmission determination to be performed, and decoding processing, error correction processing, and error determination processing operations are enabled when that data reliability exceeds a predetermined threshold value, making it possible to suppress the power consumption of a radio apparatus.

Also, in this embodiment, control section 109 of radio communication apparatus 100 controls transmitting section 107 so as to transmit a retransmission request to the base station at predetermined timing until the data reliability exceeds a predetermined threshold value. As shown in case 1 in FIG. 5 (*a*) and case 2 in FIG. 5 (*b*), control to stop the operation of decoding section 104 and subsequent sections and control for a retransmission request to the base station do not necessarily coincide, the essence of the present invention being that when it seems likely that error correction and error determination would give NG results and a retransmission request would occur even if the operations of decoding section 104 and subsequent sections were executed, a retransmission request is issued without performing the operations of decoding section 104 and subsequent sections.

Therefore, when it seems likely that error correction and error determination would give NG results and a retransmission request would occur even if the operations of decoding section 104 and subsequent sections were executed, unnecessary processing by decoding section 104 and subsequent sections is saved, enabling processing time and power consumption to be reduced.

Execution of operation control of decoding section 104 only, and execution of operation control of decoding section 104 and subsequent sections, will now be explained. In this embodiment, the number of times decoding processing, error correction processing, and error determination processing are executed can be reduced, and power consumption can be suppressed, by performing operation control for decoding section 104 and subsequent sections. Performing operation control for the decoding section and subsequent sections is particularly useful in the case of an apparatus equipped with a plurality of decoding sections 104 and subsequent sections. Looking ahead to future high-speed, large-volume communications, power consumption by the decoding section and subsequent sections is expected to account for a greater proportion of overall power consumption, and therefore performing operation control for the decoding section and subsequent sections will become increasingly important. A similar effect can also be obtained for an apparatus in which only decoding section 104 operation control is performed. This is effective, for example, in the case of an apparatus that performs only decoding processing, and does not perform error correction processing or error determination processing, or when it is necessary to continue processing for error correction processing and error determination processing for another reason, and so forth.

In this embodiment, when data reliability is determined by retransmission determination section 108, the timing for adding together data reliabilities is taken to be the timing at which a packet arrives and the reliability of an individual packet is found from the communication state, but any kind of timing may be used as long as it is related to packet arrival, and any addition values (such as ¼, ½, and so forth) corresponding to communication states may also be used. The highest frequency of timing related to packet arrival is one addition per packet, but the frequency of addition is not limited to this.

A possible way of increasing the likelihood of data reliability is to implement feedback of simulation or field test results, or a software profile of the actual device, in collecting data related to the communication state and data reliability.

Embodiment 2

Figure 7:
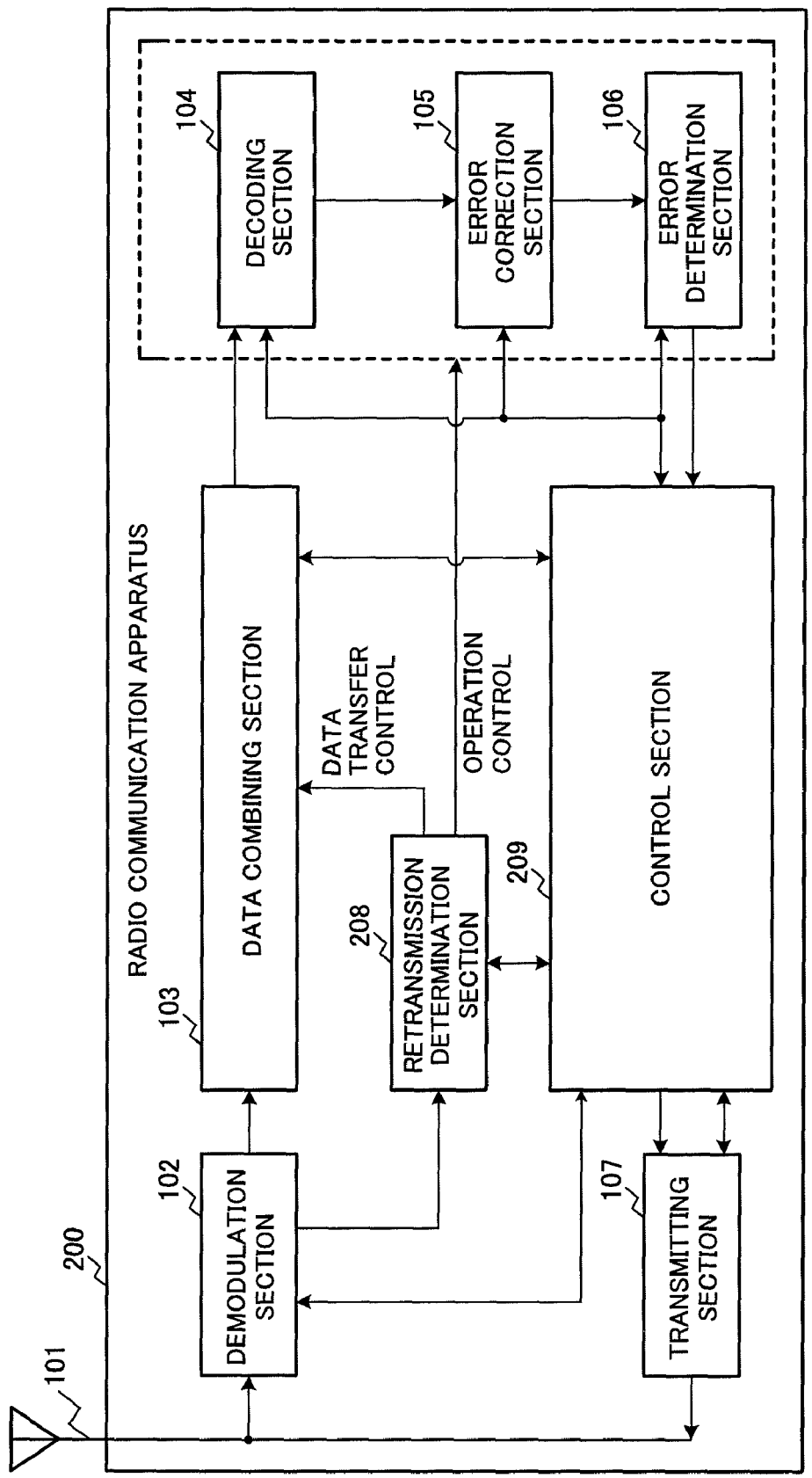
FIG. 7 is a configuration block diagram of a radio communication apparatus according to Embodiment 2 of the present invention.

FIG. 7 is a configuration block diagram of a radio communication apparatus according to Embodiment 2 of the present invention. In the description of this embodiment, configuration components identical to those in FIG. 2 are assigned the same reference codes as in FIG. 2, and duplicate descriptions are omitted.

In FIG. 7, a radio communication apparatus 200 is configured by means of a radio antenna 101, a demodulation section 102, a data combining section 103, a decoding section 104, an error correction section 105, an error determination section 106, a transmitting section 107, a retransmission determination section 208, and a control section 209.

Retransmission determination section 208 is configured by means of hardware (HW) independent of control section 209, and determines data reliability based on the communication state (communication path radio wave state) of receive data for which reception, demodulation processing, and so forth has been performed by demodulation section 102. Data reliability determination is performed using number-of-retransmissions determination table 110 shown in FIG. 3.

Control section 209 is configured by means of a microprocessor or the like, and by executing software or by means of firmware, performs basic control such as generation, setting, and reset control for various parameters of radio antenna 101, demodulation section 102, data combining section 103, decoding section 104, error correction section 105, error determination section 106, and transmitting section 107, and also control for operating decoding section 104 and subsequent sections, or not operating decoding section 104 and subsequent sections and issuing a retransmission request, based on the data reliability determination result from retransmission determination section 208.

That is to say, if data reliability determined by retransmission determination section 208 is greater than or equal to a predetermined threshold value (for example, if data reliability is greater than or equal to 1), control section 209 performs control for operation of decoding section 104 and subsequent sections (that is, decoding section 104, error correction section 105, and error determination section 106) and also performs control for data transfer from data combining section 103 to decoding section 104, whereas if data reliability determined by retransmission determination section 208 is less than a predetermined threshold value, control section 209 performs control so that decoding section 104 and subsequent sections are not operated and a retransmission request is issued. Here, retransmission determination section 208 performs addition of data reliability each time data retransmission is performed, based on the communication state (communication path radio wave state), and the totaled data reliability is the determination result. Control section 209 only sets operation enabling for decoding section 104, error correction section 105, and error determination section 106 when the totaled data reliability exceeds a predetermined threshold value.

The operation of radio communication apparatus 200 configured as described above is the same as that of radio communication apparatus 100 of Embodiment 1, and therefore a description thereof is omitted here.

In previously described Embodiment 1, it is assumed that determination of the number of retransmissions and retransmission request control by retransmission determination section 108 and control section 109 are executed by firmware. In contrast, in Embodiment 2, retransmission determination section 208 is configured as hardware (HW) independently of control section 209. Providing retransmission determination section 208 as hardware (HW) independently of control section 209 results in fewer control processing steps than when determination of the number of retransmissions and so for this executed by firmware, and enables an effect of being able to perform equivalent processing at lower power consumption to be obtained.

Embodiment 3

Figure 8:
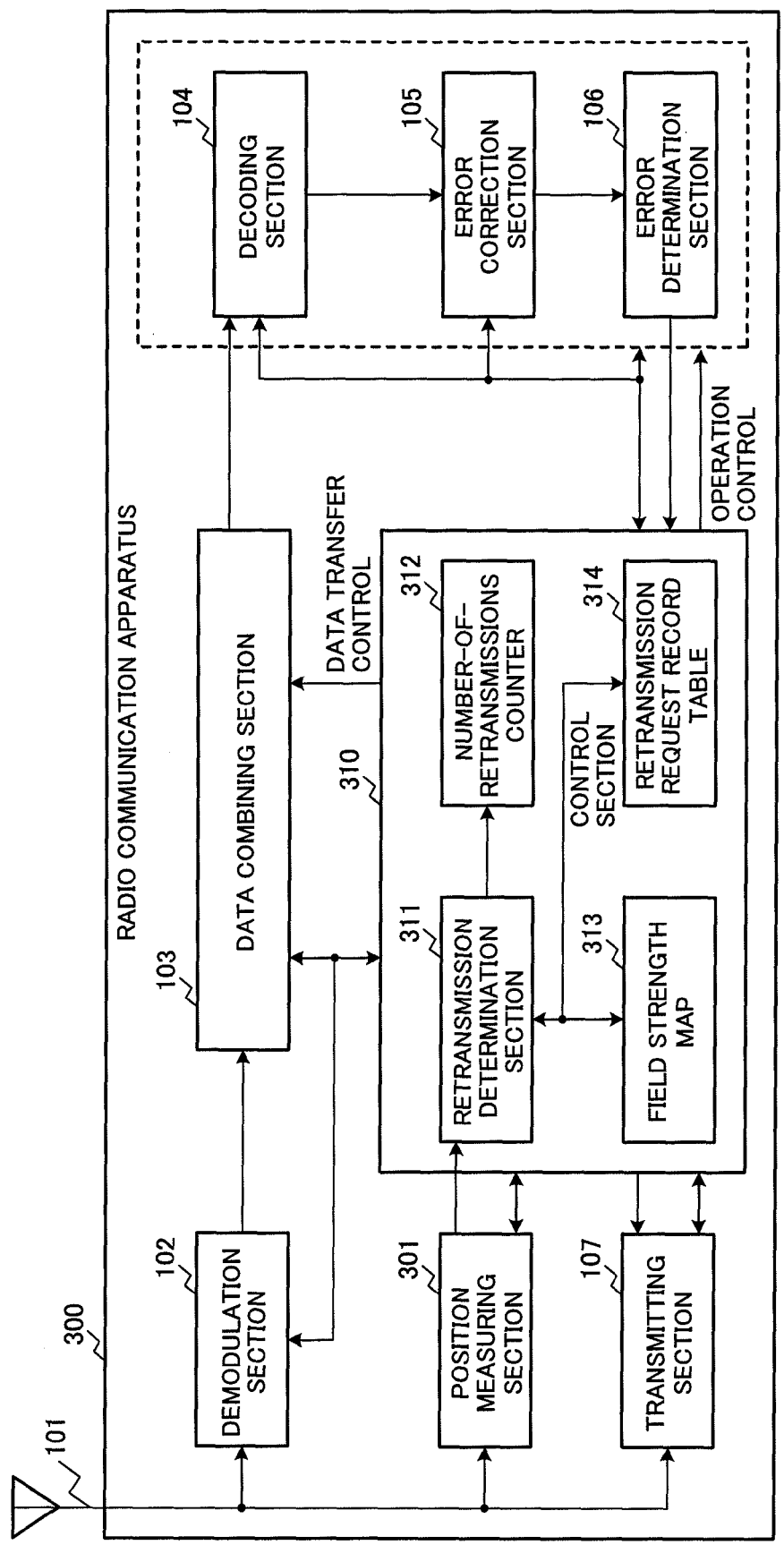
FIG. 8 is a configuration block diagram of a radio communication apparatus according to Embodiment 3 of the present invention.

FIG. 8 is a configuration block diagram of a radio communication apparatus according to Embodiment 3 of the present invention. In the description of this embodiment, configuration components identical to those in FIG. 2 are assigned the same reference codes as in FIG. 2, and duplicate descriptions are omitted.

In FIG. 8, a radio communication apparatus 300 is configured by means of a radio antenna 101, a demodulation section 102, a data combining section 103, a decoding section 104, an error correction section 105, an error determination section 106, a transmitting section 107, a position measuring section 301, and a control section 310.

Figures 9, 10:
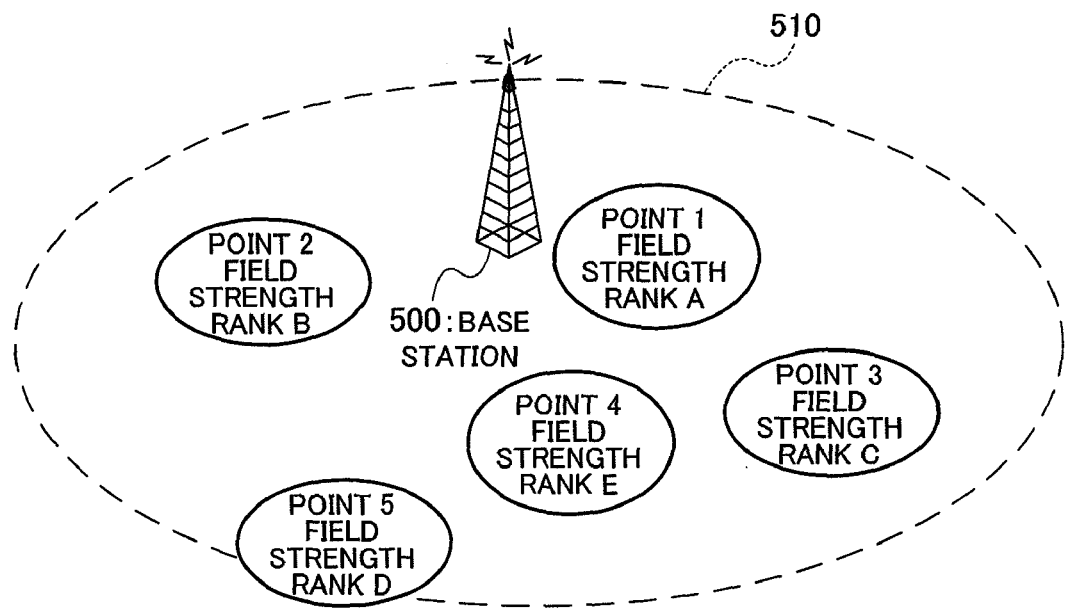
FIG. 9 is a drawing showing an example of a field strength map referenced by the control section of a radio communication apparatus according to above Embodiment 3.
FIG. 10 is a drawing showing an example of a retransmission request record count table referenced by the control section of a radio communication apparatus according to above Embodiment 3.

Position measuring section 301 acquires position information for radio communication apparatus 300 by means of communication via a base station 500 (see FIG. 9).

Control section 310 is equipped with a retransmission determination section 311, a number-of-retransmissions counter 312, a field strength map 313, and a retransmission request record table 314. Number-of-retransmissions counter 312, field strength map 313, and retransmission request record table 314 are stored in a predetermined storage area of nonvolatile memory such as EEPROM.

Retransmission determination section 311 determines the number of receive data retransmission requests using position measuring section 301, field strength map 313, and retransmission request record table 314.

Number-of-retransmissions counter 312 counts the number of receive data retransmissions found by retransmission determination section 311.

Field strength map 313 holds field strength ranks at locations ("specific positions") within the cell radius of base station 500 (see FIG. 9). Field strength map 313 will be described later herein with reference to FIG. 9.

Retransmission request record table 314 shows the correspondence between field strength ranks found from field strength map 313 and retransmission request record values for those field strength ranks. Retransmission request record table 314 will be described later herein with reference to FIG. 10.

Control section 310 performs operation control for decoding section 104, error correction section 105, and error determination section 106, and control for data transfer from data combining section 103 to decoding section 104. Control section 310 also performs generation, setting, and reset control, etc., for various parameters of radio antenna 101, demodulation section 102, data combining section 103, decoding section 104, error correction section 105, error determination section 106, transmitting section 107, and position measuring section 301.

Transmitting section 107 transmits data that has undergone error determination processing by error determination section 106 to base station 500.

FIG. 9 is a drawing showing an example of field strength map 313 referenced by control section 310 of radio communication apparatus 300.

In FIG. 9, base station 500 performs base station control such as data transmission to a mobile device (mobile communication apparatus 300) within a transmission area 510.

Radio communication apparatus 300 creates and stores transmission area 510 of base station 500 in advance as field strength map 313. In FIG. 9, transmission area 510 is assumed to represent the scope of creation of field strength map 313, and field strength map 313 stores past field strengths at locations (points) 1 through 5 within the radius of transmission area 510, together with the associated ranks. For example, field strength rank A of point 1 is greater than or equal to 45 dB and less than 55 dB, field strength rank B of point 2 is greater than or equal to 35 dB and less than 45 dB, and so forth. Field strength map 313 may be set in advance as field strength map 313 of control section 310 of radio communication apparatus 300, and field strength map 313 may also be set or updated using field strength data received by radio communication apparatus 300 in the past.

FIG. 10 is a drawing showing an example of retransmission request record table 314 referenced by control section 310 of radio communication apparatus 300.

Retransmission request record table 314 is a table for showing the correspondence between field strength ranks found from field strength map 313 and retransmission request record values for those field strength ranks. In FIG. 10, field strength ranks A through F correspond to retransmission request record counts 1 through 6 respectively. Field strength rank A of point 1 shown in field strength map 313 is the highest field strength, and the retransmission request record count for field strength rank A is 1. Similarly, the retransmission request record count for field strength rank B of point 2 is 2, and the retransmission request record count for field strength rank C of point 3 is 3. In this way, the retransmission request record count is determined when the field strength rank of a point at which radio communication apparatus 300 is positioned is found.

In this embodiment, an example is given in which radio communication apparatus 300 ascertains a retransmission request record count, and a mobile device (mobile communication apparatus 300) ascertains field strength ranks A through E of points 1 through 5, and performs retransmission the number of retransmission times corresponding to the field strength rank. According to the mode of this embodiment, all data can be acquired concerning a location visited by a mobile device, and there is consequently an effect of being able to create field strength map 313 without being restricted to the cell range of base station 500. However, when a mobile device is a mobile phone or the like, for example, the internal memory capacity is smaller than that of a personal computer (PC) or server, and therefore the amount of data of field strength map 313 is limited.

A mode is also possible whereby base station 500 ascertains the retransmission request record count. A mobile device (mobile communication apparatus 300) ascertains a field strength rank A through F of each of points 1 through 5, and sends mobile device field strength rank data to base station 500. Base station 500 acquires the field strength rank data from the mobile device, and performs retransmission to the mobile device the number of retransmission times corresponding to the field strength rank. According to this mode, field strength ranks can be calculated using data of a plurality of mobile devices, and it is therefore possible to shorten the field strength map creation time and increase field strength map accuracy. However, when a field strength map is created, traffic increases become field strength rank data for each location is sent to base station 500 from the mobile devices.

Figure 11:
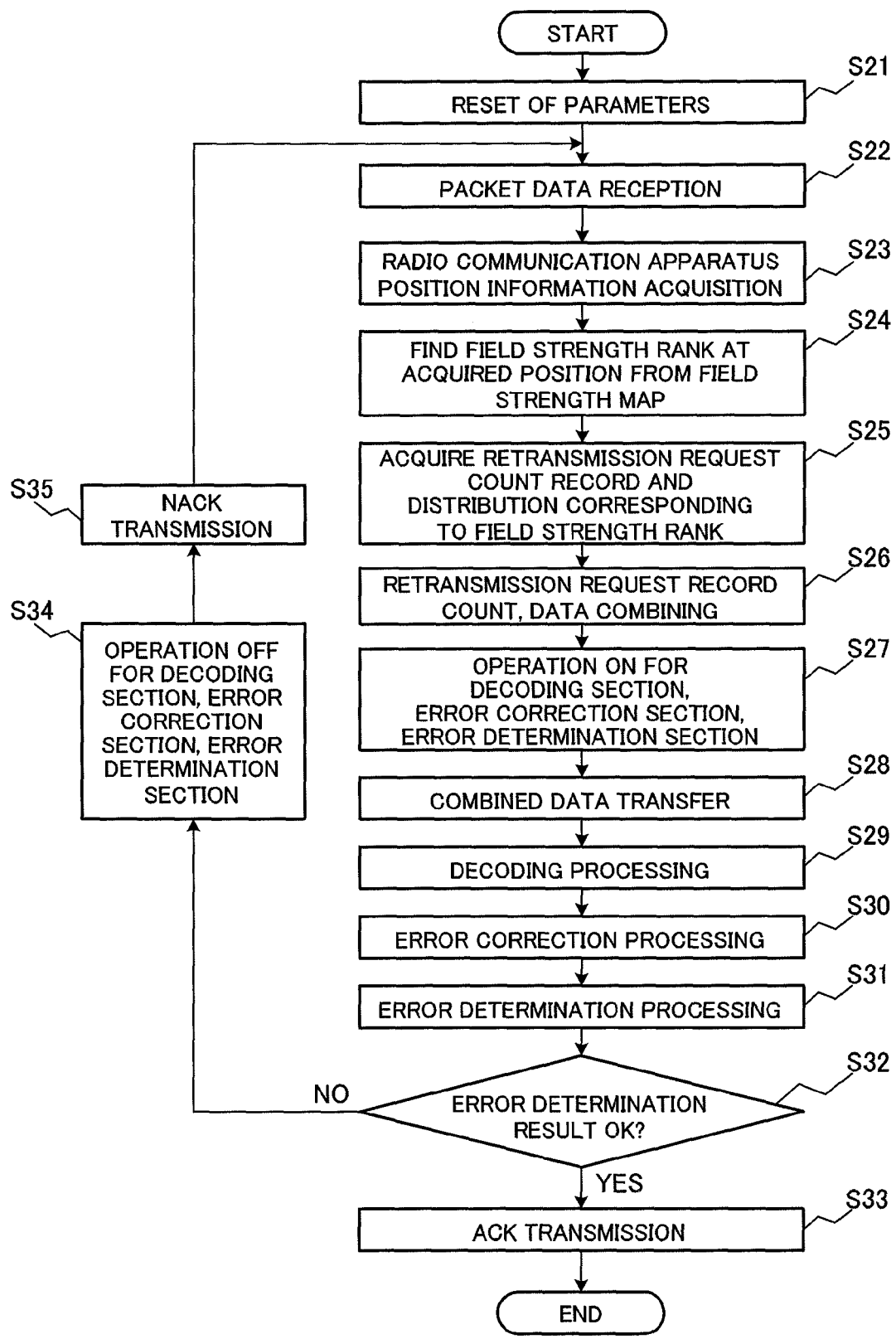
FIG. 11 is a flowchart showing communication processing of a radio communication apparatus according to above Embodiment 3.

FIG. 11 is a flowchart showing communication processing of radio communication apparatus 300, executed by control section 310.

First, parameters are reset in step S21, and in step S22 packet data is received via radio antenna 101. Then, in step S23, position measuring section 301 acquires radio communication apparatus 300 position information, and in step S24 finds the rank of the field strength at the acquired radio communication apparatus 300 position from field strength map 313 shown in FIG. 8 and FIG. 9. This rank of the field strength found from field strength map 313 is called the field strength rank. In field strength map 313, ranks have been assigned in the past in a field strength range at each location within the base station radius. For example, field strength rank A shown in FIG. 9 is greater than or equal to 45 dB and less than 55 dB, field strength rank B is greater than or equal to 35 dB and less than 45 dB, and so forth.

Next, in step S25, the retransmission request record count is determined from retransmission request record table 314 shown in FIG. 10. A retransmission request record count included in retransmission request record table 314 may be the nearest number of retransmission requests for the relevant field strength rank, or may be a past number of retransmission requests, or may be an average of past numbers of retransmission requests.

Then, in step S26, data combining is performed a number of times equivalent to the retransmission request record count, and in step S27 an operation ON setting is made for decoding section 104 and subsequent sections (see the area enclosed by a dotted line in FIG. 2)—that is, operation enabling is performed for decoding section 104, error correction section 105, and error determination section 106.

In step S28, control section 310 sets enabling of transfer from data combining section 103 to decoding section 104, and in step S29, decoding section 104 decodes the data sequence processed by data combining section 103. Then, in step S30, error correction section 105 performs error correction using the data sequence processed by decoding section 104, and in step S31, error determination section 106 performs error determination using the data processed by error correction section 105.

In step S32, the error determination section 106 error determination result is determined, and if the error determination result is OK, in step S33 an ACK signal is transmitted to the radio base station by transmitting section 107, and the processing flow is terminated.

If the error determination result in above step S32 is NG, in step S34 stoppage of the operation of decoding section 104, error correction section 105, and error determination section 106 is set, and in step S35 a NACK signal is transmitted to the radio base station by transmitting section 107, and the processing flow returns to above step S22.

Thus, according to this embodiment, the number of retransmissions can be determined using position information, and past data for a radio communication apparatus can be used, enabling decoding processing, error correction processing, and error determination processing to be controlled according to a number of retransmissions based on a user's movement status, and radio communication apparatus power consumption to be suppressed.

In this embodiment, latitude and longitude are used as position information indicating the location of a radio communication apparatus, but position information is not limited to this, and various kinds of information that enable the location of a radio communication apparatus to be identified may be used, such as an address or the name of a nearby landmark, station, road, intersection, or the like.

Also, in this embodiment, a mode has been illustrated in which position measuring section 301 acquires radio communication apparatus 300 position information by means of communication via base station 500, but the same effect can also be obtained by using information not acquired via a base station as position information (for example, position information conveyed by radio from a building, utility pole, traffic signal, or public facility, position information obtained by approaching a vending machine or the like, and so forth).

Furthermore, in this embodiment, field strength map 313 is provided in radio communication apparatus 300, but a base station or other apparatus may also hold this field strength map. Also, it is also possible to perform fine case differentiation by having a plurality of these field strength maps according to differences in environmental conditions such as weather, time, movement, and so forth Moreover, in this embodiment, position measuring section 301 is located on the same hierarchical level as control section 310, but position measuring section 301 may also be inside control section 310, or may be located in another block on the same level as control section 310. Similarly, retransmission determination section 311, number-of-retransmissions counter 312, field strength map 313, and retransmission request record table 314 are located inside control section 310, but may also be located on the same level as control section 310, or may be located in another block on the same level as control section 310.

Embodiment 4

Figure 12:
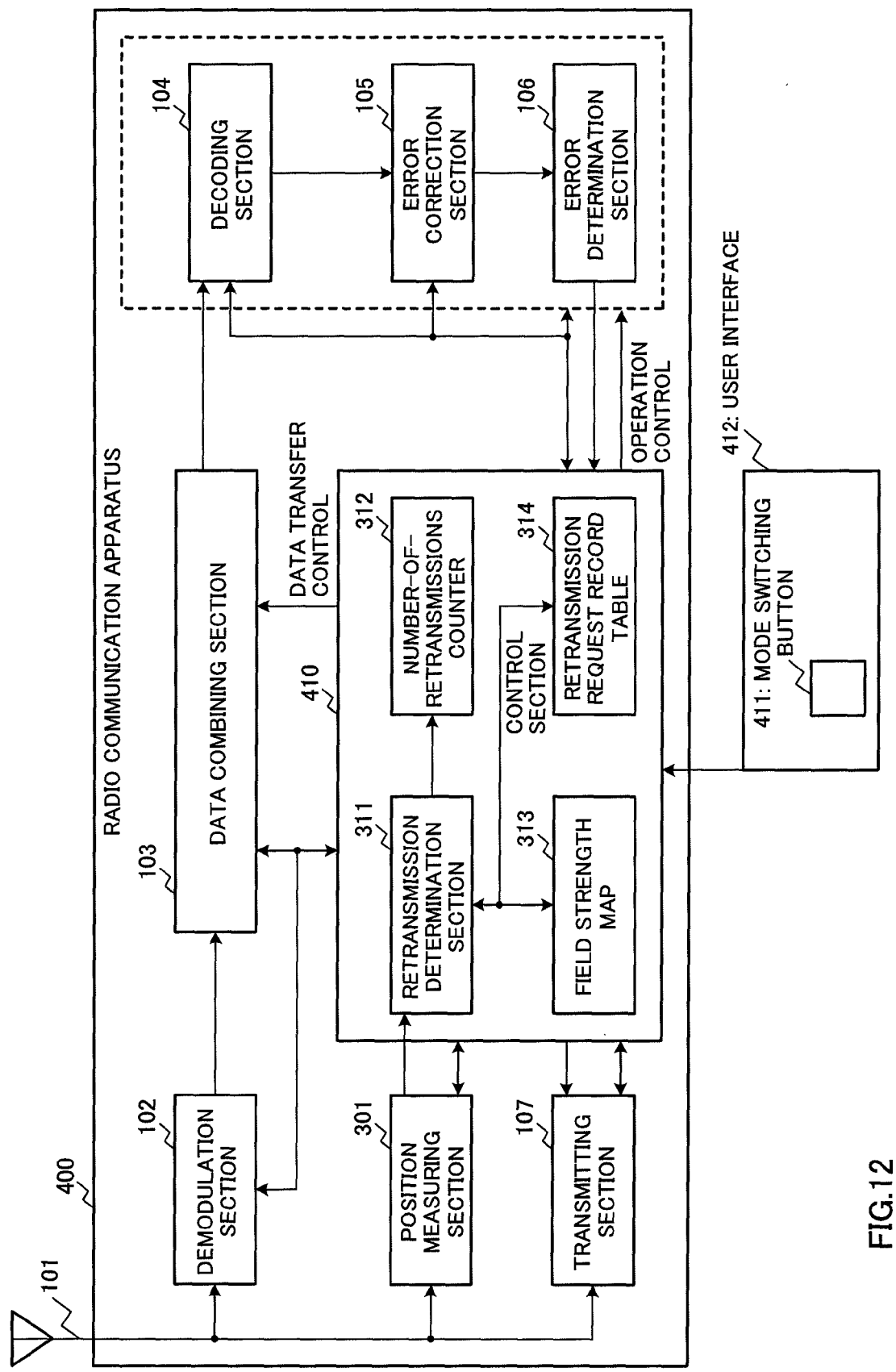
FIG. 12 is a configuration block diagram of a radio communication apparatus according to Embodiment 4 of the present invention.

FIG. 12 is a configuration block diagram of a radio communication apparatus according to Embodiment 4 of the present invention. In the description of this embodiment, configuration components identical to those in FIG. 8 are assigned the same reference codes as in FIG. 8, and duplicate descriptions are omitted.

In FIG. 12, a radio communication apparatus 400 is configured by means of a radio antenna 101, a demodulation section 102, a data combining section 103, a decoding section 104, an error correction section 105, an error determination section 106, a transmitting section 107, a position measuring section 301, a control section 410, and a user interface 412 having a mode switching button 411.

Position measuring section 301 acquires position information for radio communication apparatus 400 by means of communication via a base station 500 (see FIG. 9).

Control section 410 is equipped with a retransmission determination section 311, a number-of-retransmissions counter 312, a field strength map 313, and a retransmission request record table 314, and receives a "mode using position information/mode not using position information" switchover directive from user interface 412 by means of depression of mode switching button 411.

By means of depression of mode switching button 411, user interface 412 switches between a "mode not using position information" in which decoding section 104, error correction section 105, and error determination section 106 of radio communication apparatus 400 are controlled without using position information, and a "mode using position information" in which decoding section 104, error correction section 105, and error determination section 106 of radio communication apparatus 400 are controlled using position information, according to a user's directive.

For example, during communication in the mode not using position information, the user can switch the mode of radio communication apparatus 400 to the "mode using position information" by pressing mode switching button 411.

Figure 13:
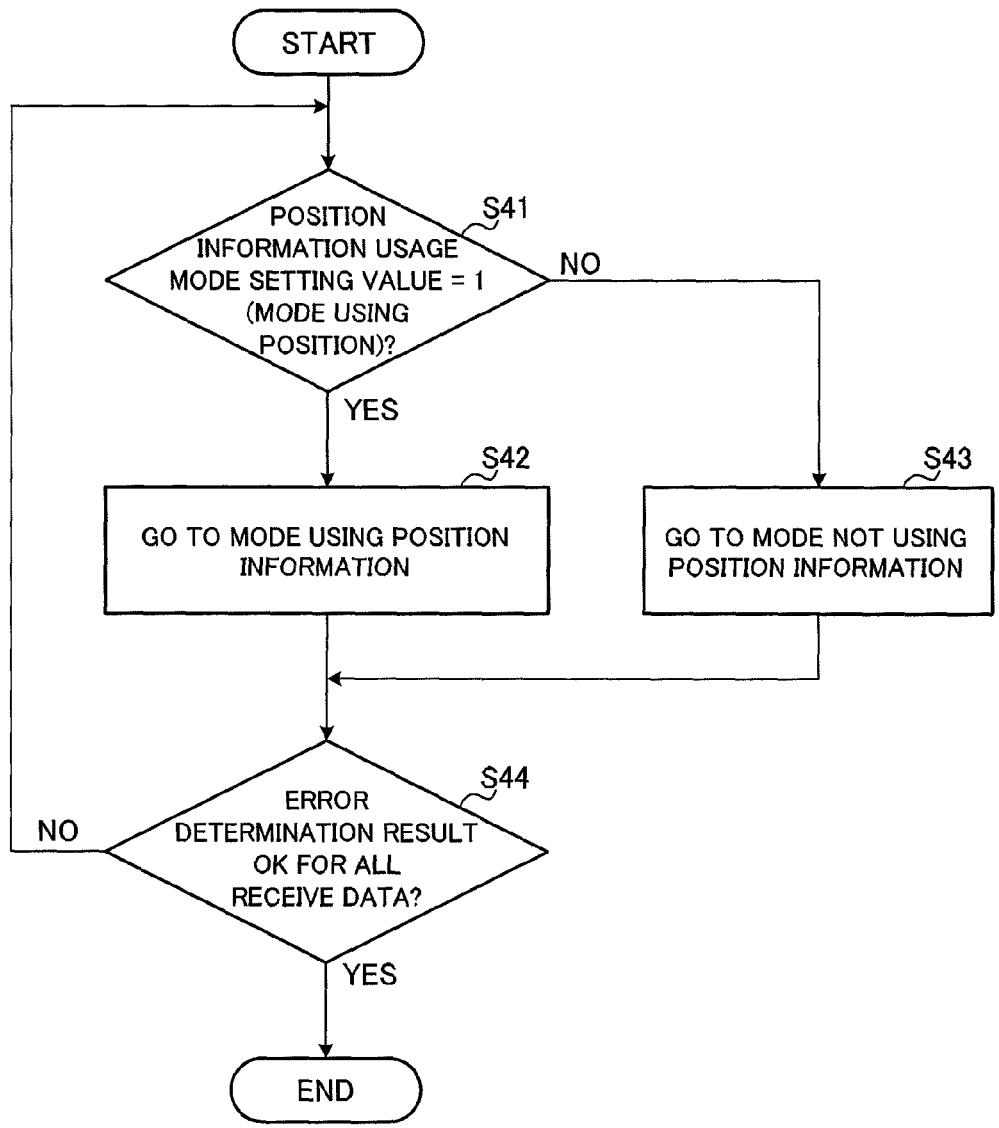
FIG. 13 is a flowchart showing communication processing of a radio communication apparatus according to above Embodiment 4.

FIG. 13 is a flowchart showing communication processing of radio communication apparatus 400, executed by control section 410.

First, in step S41, determination of the mode that uses or does not use position information is performed. The parameter used to determine whether or not position information is used is called the position information usage mode setting value. The position information usage mode setting value is switched by depression of mode switching button 411 by the user, with the mode using position information being set when the value is 1, and the mode not using position information being set when the value is 0. The processing flow proceeds to step S42 if the position information usage mode setting value is 1, or to step S43 if the position information usage mode setting value is 0.

If the position information usage mode setting value is 1 in above step S41, in step S42 the system proceeds to the mode using position information, and when mode using position information processing ends, the processing flow proceeds to step S44. Operation in the mode using position information is the same as in above Embodiment 3.

If the position information usage mode setting value is 0 in above step S41, in step S43 the system proceeds to the mode not using position information. Operation in the mode not using position information is the same as in Embodiment 1 or Embodiment 2.

In step S44, it is determined whether or not reception of all packet data has been completed. If there is further receive data, the processing flow returns to above step S41, and if there is no explicit mode change request from the user at this time, the previous mode setting is continued. If there is no further receive data in above step S44, the processing flow is terminated.

Thus, according to this embodiment, a user can select a mode in which position information is used or a mode in which position information is not used, enabling switching between a mode in which position information is used and a mode in which position information is not used to be performed in accordance with a user's request.

For example, in places visited repeatedly in everyday life, such as schools, workplaces, and homes, sufficient position information and field strength data can be acquired for creating a field strength map, and a low-power-consumption effect can be expected from the use of position information. However, in places not visited repeatedly, such as during a trip, it is probable that sufficient position information and field strength data for creating a field strength map cannot be acquired, and therefore position information cannot be used effectively. If a user selects the mode using position information in places he or she frequently visits, and selects the mode not using position information in places he or she seldom visits, operation stoppage control can be executed for decoding section 104, error correction section 105, and error determination section 106 of radio communication apparatus 400 in accordance with the user's behavior pattern, and a low-power-consumption effect can be obtained.

In this embodiment, an example has been shown in which a mode switching button is pressed, but the same effect can also be obtained by mode switching by means of a switch, mode switching by means of speech, mode switching by means of vibration, and so forth, as long as the mode switching is an explicit user action.

Embodiment 5

User interface 412 is used for determination of the speed of movement of a radio communication apparatus 400, in order to switch between modes that do and do not use position information as described in Embodiment 4.

During high-speed movement in a fast train or the like, for example, field strength used in Embodiments 1 and 2, or position information used in Embodiment 3, fluctuates greatly. Although the situation changes momentarily in this way, the effect obtained by controlling decoding section 104, error correction section 105, and error determination section 106 using position information or field strength is small.

Thus, in Embodiment 5, control is performed so that the number of retransmissions is fixed and decoding section 104, error correction section 105, and error determination section 106 are operated when a user notifies radio communication apparatus 400 that radio communication apparatus 400 will move at high speed or is moving at high speed using user interface 412. By this means, computation for calculating the number of retransmissions during fast movement in a high-speed train or the like can be reduced, and since decoding section 104, error correction section 105, and error determination section 106 are operated after performing data combining a fixed number of times, a low-power-consumption effect can be obtained.

In this case, radio communication apparatus 400 is notified of the speed of movement by the user using user interface 412, but notification of the speed of movement may also be performed by another apparatus or a third party. For example, when the user is in a fast train, it is possible to notify radio communication apparatus 400 that high-speed movement is in progress using a short-range radio wave or the like, and perform control so that the number of retransmissions is fixed automatically.

It is also possible for radio communication apparatus 400 to perform switching between modes that do and do not use position information automatically. For example, a position information usage mode setting value is stored at a place visited by the user in the past, and when the same place is visited again, radio communication apparatus 400 automatically uses that set value.

In this example, radio communication apparatus 400 switches the position information usage mode setting value automatically, but switching of radio communication apparatus 400 between modes that do and do not use position information may also be performed by having base station 500 or another apparatus issue a directive for switching between modes that do and do not use position information to radio communication apparatus 400. For example, in an area with high-rise buildings, there is a high probability of GPS (Global Positioning System) measurement precision being poor due to the effects of multipath propagation and so forth, and position information being inaccurate. Having base station 500 select the mode in which radio communication apparatus 400 position information is not used at this time makes it possible to prevent control section 410 of radio communication apparatus 400 controlling decoding section 104, error correction section 105, and error determination section 106 using position information with poor measurement precision, and enables wasteful power consumption to be reduced.

The above descriptions are illustrations of preferred embodiments of the present invention, and the scope of the present invention is not limited to these.

In the above embodiments, the descriptions have related to a communication terminal apparatus such as a PHS (Personal Handy-phone System) or mobile phone, but this is just an example and the present invention can be applied to any kind of apparatus that performs radio communication via a base station, and there are no restrictions on the type or number of communication methods. The same also applies to the number of base stations and communication terminal apparatuses.

In the above embodiments, the terms "communication system" and "radio communication apparatus" have been used, but this is simply for convenience in describing the embodiments, and terms such as "mobile phone," "communication apparatus," "mobile communication system" or the like may, of course, also be used.

There are no restrictions on the type, number, or connection method of sections configuring an above-described communication terminal apparatus or communication system, and any type, number, or connection method may be used for the decoding section(s), error correction section(s), and transmitting section(s), for example.

An above-described communication terminal apparatus and communication system are also implemented by a program that causes that communication terminal apparatus and communication system to function. This program is stored in/on a computer-readable recording medium.

As described above, according to the present invention, decoding processing, error correction processing, and error determination processing are performed only when necessary, enabling the number of times decoding processing, error correction processing, and error determination processing are executed to be reduced, and power consumption of a radio communication apparatus to be suppressed.

Therefore, a communication terminal apparatus, communication system, and communication method according to the present invention are useful for a communication system equipped with a plurality of communication terminal apparatuses present within the radio communication coverage area of a base station. Operation control of decoding processing, error correction processing, and error determination processing is performed according to the number of data retransmissions and field strength, enabling current consumption to be suppressed, and a data processing method to be selected according to the operating state of a user. The present invention has an effect of enabling unnecessary retransmissions to be reduced and throughput of a radio communication apparatus to be improved, and is not restricted to radio communications, but can be also be applied to a data processing apparatus, data processing method, and data processing program for image processing or the like.

What is claimed is:

1. A communication terminal apparatus, comprising:
   a demodulator that performs demodulation of received data;
   a data combiner that combines said demodulated data with past data;
   a decoder that decodes said combined data;
   an error corrector that performs error correction processing using said decoded data;
   an error determiner that determines a data error using data on which said error correction processing has been performed;
   a data reliability determiner that determines data reliability based on a communication state of said received data; and
   a controller that stops an operation of said decoder until said data reliability exceeds a predetermined threshold value; wherein
   said data reliability determiner has beforehand a data reliability of each packet corresponding to a plurality of communication states, adds data reliabilities of said each packet at a timing related to said packet arrival, and determines that data reliability after addition exceeds a predetermined threshold value.

2. The communication terminal apparatus according to claim 1, wherein said controller stops the operation of said decoder, said error corrector, and said error determiner until said data reliability exceeds said predetermined threshold value.

3. The communication terminal apparatus according to claim 1, wherein said controller, when said data reliability exceeds the predetermined threshold value, enables the operation of said decoder, said error corrector, and said error determiner, and enables data transfer from said data combiner to said decoder.

4. The communication terminal apparatus according to claim 1, wherein said controller issues a retransmission request at predetermined timing until said data reliability exceeds the predetermined threshold value.

5. The communication terminal apparatus according to claim 1, wherein said controller sets a number of retransmission requests based on a communication state of said receive data.

6. The communication terminal apparatus according to claim 1, further comprising:
a field strength map that stores a field strength rank at a specific position within a radio communication coverage area of a base station;
a number-of-retransmissions record table showing correspondence between said field strength rank and a retransmission request record value; and
a position information measurer that measures position information,
wherein said controller references said field strength map based on said measured position information and finds said field strength rank, and references said number-of-retransmissions record table based on that field strength rank and sets a number of retransmission requests.

7. The communication terminal apparatus according to claim 6, further comprising a mode setter that sets a mode that uses said position information,
wherein said controller, when said mode using position information has been set, references said field strength map based on said measured position information and finds said field strength rank, and references said number-of-retransmissions record table based on that field strength rank and sets a number of retransmission requests.

8. The communication terminal apparatus according to claim 6, further comprising a field strength map creator that creates or updates said field strength map based on a communication state of said receive data at said measured specific position.

9. A communication system equipped with a base station and a plurality of communication terminal apparatuses present within a radio communication coverage area of said base station, wherein each of said plurality of communication terminal apparatuses comprise:
a demodulator that performs demodulation of received data;
a data combiner that combines said demodulated data with past data;
a decoder that decodes said combined data;
an error corrector that performs error correction processing using said decoded data;
an error determiner that determines a data error using data on which said error correction processing has been performed;
a data reliability determiner that determines data reliability based on a communication state of said received data; and
a controller that stops an operation of said decoder, said error corrector, and said error determiner, until said data reliability exceeds a predetermined threshold value; wherein
said data reliability determiner has beforehand a data reliability of each packet corresponding to a plurality of communication states, adds data reliabilities of said each packet at a timing related to said packet arrival, and determines that data reliability after addition exceeds a predetermined threshold value.

10. The communication system according to claim 9, wherein said controller issues a retransmission request to said base station at a predetermined timing until said data reliability exceeds a predetermined threshold value.

11. The communication system according to claim 9, wherein:
said each of said plurality of communication terminal apparatuses further comprise:
a field strength map that stores a field strength rank at a specific position within a radio communication coverage area of said base station;
a number-of-retransmissions record table showing correspondence between said field strength rank and a retransmission request record value;
a position information measurer that measures position information of the communication terminal apparatus itself; and
a mode setter that sets a mode that uses said position information in accordance with a directive from said base station, and
said controller, when said mode using position information has been set, references said field strength map based on said measured position information and finds said field strength rank, and references said number-of-retransmissions record table based on that field strength rank and sets a number of retransmission requests.

12. The communication system according to claim 9, wherein said base station further comprises a field strength map creator that creates or updates said field strength map based on a communication state of said received data at said specific position measured by said plurality of communication terminal apparatuses.

13. A communication method that performs a radio communication via a base station, said communication method comprising:
performing a demodulation of received data;
combining said demodulated data with past data;
decoding said combined data;
performing error correction processing using said decoded data;
determining a data error using data on which said error correction processing has been performed;
determining data reliability based on a communication state of said received data; and
issuing a retransmission request to said base station at predetermined timing and stopping an operation of said decoding onward until said data reliability exceeds a predetermined threshold value; wherein
said determining data reliability has beforehand a data reliability of each packet corresponding to a plurality of communication states, adds data reliabilities of said each packet at a timing related to said packet arrival, and determines that data reliability after addition exceeds a predetermined threshold value.

* * * * *